United States Patent [19]

Simpson et al.

[11] Patent Number: 4,948,662

[45] Date of Patent: Aug. 14, 1990

[54] BORON NITRIDE COATED CERAMIC FIBERS AND COATING METHOD

[75] Inventors: Frederick H. Simpson, Seattle; Juris Verzemnieks, Tacoma, both of Wash.

[73] Assignee: The Boeing Company, Seattle, Wash.

[21] Appl. No.: 848,539

[22] Filed: Apr. 7, 1986

Related U.S. Application Data

[63] Continuation-in-part of Ser. No. 711,898, Mar. 14, 1985, Pat. No. 4,605,588.

[51] Int. Cl.$^5$ .......................... D04H 1/58; B32B 9/00
[52] U.S. Cl. .................... 428/288; 427/255; 427/255.4; 428/366; 428/375; 428/388
[58] Field of Search ............... 427/255, 255.1, 255.2, 427/255.4, 314, 399; 428/288, 366, 378, 388, 698

[56] References Cited

U.S. PATENT DOCUMENTS

| | | | |
|---|---|---|---|
| 2,745,763 | 5/1956 | Ueltz | 106/65 |
| 2,958,610 | 11/1960 | Ramirez et al. | 427/305 |
| 3,058,809 | 10/1962 | Taylor | 423/290 |
| 3,212,926 | 10/1965 | Morelock | 428/698 |
| 3,351,484 | 11/1967 | Gutzeit | 428/408 |
| 3,386,918 | 6/1968 | Hough | 252/63.5 |
| 3,422,321 | 1/1969 | Tombs | 427/255.2 |
| 3,451,840 | 6/1969 | Hough | 427/255.1 |
| 3,520,722 | 7/1970 | Scott | 427/255.2 |
| 3,573,969 | 4/1971 | Camahort et al. | 427/399 |
| 3,576,610 | 4/1971 | Mathewson | 51/295 |
| 3,634,132 | 1/1972 | Camahort et al. | 428/366 |
| 3,668,059 | 6/1972 | Economy et al. | 501/96 |
| 3,720,536 | 3/1973 | Scola et al. | 427/444 |
| 3,811,928 | 5/1974 | Henney et al. | 427/255.4 |
| 3,837,997 | 9/1974 | Economy et al. | 428/366 |
| 3,955,038 | 5/1976 | Lindstrom et al. | 427/419.4 |
| 4,009,305 | 2/1977 | Fujimaki et al. | 427/399 |
| 4,163,074 | 7/1979 | Ebata et al. | 427/419.2 |
| 4,196,233 | 4/1980 | Bitzer et al. | 427/255 |
| 4,284,610 | 8/1981 | Hamilton | 501/95 |
| 4,309,203 | 1/1982 | Tworek et al. | 428/366 |
| 4,331,772 | 5/1982 | Torre et al. | 501/97 |
| 4,335,190 | 6/1982 | Bill et al. | 427/419.2 |
| 4,346,147 | 8/1982 | Barlier et al. | 427/314 |
| 4,605,588 | 8/1986 | Simpson et al. | 427/255.4 |
| 4,642,271 | 2/1987 | Rice | 428/902 |

*Primary Examiner*—Sadie Childs
*Attorney, Agent, or Firm*—John C. Hammar

[57] ABSTRACT

Oxide-based ceramic fibers are treated in a novel process to create a substantially uniform boron nitride barrier coating at their surface. The process involves heating the fibers in a nitriding atmosphere at between about 2200–2600° F. to create a BN coating at the surface of the fiber from boron initially within the fiber.

21 Claims, No Drawings

BORON NITRIDE COATED CERAMIC FIBERS AND COATING METHOD

REFERENCE TO RELATED APPLICATIONS

This application is a continuation-in-part application based upon United States Patent Application Ser. No. 711,898, filed Mar. 14, 1985 now U.S. Pat. No. 4,605,588.

TECHNICAL FIELD

The present invention relates to oxide-based ceramic fibers, and more particularly, to oxide-based aluminoborosilicate glass fibers having boron nitride coatings.

BACKGROUND ART

Fibrous composites are promising for making ceramics considerably tougher by imparting resistance to crack propagation to the ceramic. Carbon and silicon carbide fiber reinforcement strengthens the brittle matrices of glasses and glass ceramics. A problem exists with oxide-based fibers, however, because they degrade or react with the matrix when the ceramics or glasses are molded. The reaction between the fiber and the matrix results in a high degree of bonding which renders the toughening mechanisms inoperable. This problem for oxide-based fibers can be solved by creating a barrier coating on the fibers. Preferably, a suitable barrier coating would be relatively inert, and would comprise a physical separation between the ceramic or glass matrix and the reinforcing fiber. The barrier would eliminate any reactions between the oxide fiber and the ceramic matrix or would substantially slow the kinetics of such reaction so that toughening would result in the composite.

While there are many known methods for creating a boron nitride coating on fibers, none is completely suitable For example, a boron nitride (BN) coating can be formed by coating the fibers with liquid boron oxide or boric acid prior to converting the boron oxide to BN. Liquid boron oxide is extremely damaging to oxide-based ceramic fibers, so this conventional process cannot be used to barrier coat them. Even if used, the coating that is obtained is usually irregular, especially in thickness around the fiber.

Chemical vapor deposition (CVD) has also been used to provide boron nitride coatings Chemical vapor deposition is unsatisfactory because it requires the careful and precise injection of predetermined amounts of reactive gases containing boron and nitrogen to the reaction chamber and precise control of the temperature. Only then can the gases react at the surface of the fiber and deposit a coating on the surface. Control of the deposition thickness and of the quality of the barrier coating achieved by CVD is difficult. The most serious difficulty with the CVD process, however, is ensuring that the coating is uniform about the entire surface of the fiber. In the CVD process, the gaseous components react on the first hot surface on which they come into contact. Thus, CVD coating is usually limited to monofilament applications where the entire fiber surface is readily accessible. Fiber cloths or yarns are not as amenable to creation of uniform coatings through the CVD process, since some surfaces are shadowed by other fibers.

SUMMARY OF THE INVENTION

Oxide-based ceramic fibers are uniformly coated with boron nitride in the process of the present invention with boron initially within the fiber by heating the fibers in a nitriding atmosphere so that boron, usually in the from of boria, diffuses to the surface of the fiber and reacts at the surface or slightly within the fiber near the fiber surface to form boron nitride or other boron/oxygen/ nitrogen compounds which create the barrier coating Because one component of the barrier coating (the boron) is found only within the fiber itself, the reaction between the boron and nitrogen can only take place in the region of the fiber surface. The process results in the creation of a substantially uniform, continuous thin coating at the surface of the oxide-based ceramic fiber.

BEST MODE CONTEMPLATED FOR THE INVENTION

The process of the present invention is particularly advantegeous for creating a boron nitride barrier coating on aluminoborosilicate fibers, such as NEXTEL 312 glass cloth fibers, available from 3M Corp. This fiber has about 12% boria by wt. mixed with an amorphous aluminosilicate. Fibers with similar boria content or higher concentrations are preferred. The coating is created by heating the fibers for about 2-4 hours in a nitriding atmosphere containing a mixture of ammonia, nitrogen, and hydrogen at a temperature beginning at ambient and rising within about two hours to generally within the range between about 2200-2500° F. Temperatures above 2600° F. should be avoided since the NEXTEL 312 fibers severely degrade at or above this temperature. Temperatures below 2000° F. require excessive exposure times within the furnace. At 2500° F., exposure to a nitriding atmosphere for 5-15 minutes achieves the desired boron nitride coating. At 2400° F., exposure of 15-30 minutes is required to achieve the same coating. At 2200° F., the exposure time increases to at least 90 minutes. Thus, the rate of reaction is dramatically temperature dependent and temperatures in the range of 2400-2500° F. are highly preferred.

The elevated temperature within the furnace causes boron or boria within the aluminoborosilicate fiber to diffuse from the fiber to the surface and to volatilize there. If the proper nitriding atmosphere is present during heat treatment, when this boron volatilizes, it will react at or near the surface of the fiber to form an extremely uniform, thin, and continuous coating on all the fiber surfaces including fractures and fiber ends. Because the process is diffusion dependent, it is important that the fibers contain an adequate amount of boria or boron to promote the reaction NEXTEL 312 fibers are preferred.

Boron, boron oxide, or boric acid is not added to the fibers in forming the barrier coatings. The fibers are not coated prior to entry into the furnace. Use of liquid boron oxide or boric acid should be avoided, since these compounds are harmful to the fibers.

The method of the present invention creates coated, oxide-based ceramic fibers for reinforcing in ceramics and glasses to increase their toughness. The coated fibers can be used in environments which are detrimental to the uncoated fiber, such as moist or acidic environments. Aluminoborosilicate fibers are especially adapted for use in radomes or other radar applications, where silicon carbide or carbon fibers are ineffective.

The NEXTEL 312 fibers have excellent radar transmission characteristics as does boron nitride. With the barrier coated fibers, ceramic composite radomes which are light, strong, and tough may be made without significant loss of transmission characteristics. Carbon and silicon carbide fibers cannot be used in radar applications because they absorb or reflect a substantial portion of the electromagnetic energy.

Examination of coated fibers of this invention using electron spectroscopy confirms the presence of boron nitride at the fiber surface. Complete and substantially uniform coverage of the surface results, even at fractures and fiber ends.

Preferably, the nitriding atmosphere contains an effective amount of ammonia, usually between about 5–100 vol. % of the atmosphere. Energy efficiency in the furnace is gained by diluting the ammonia with inert gases, such as nitrogen and hydrogen. Generally, between 0–12 vol. % hydrogen (and more preferably between 4–12 %) is used to dilute the ammonia, while the remainder of the nitriding atmosphere is nitrogen. Typically, the ammonia comprises between about 5–10 vol. % of the nitriding atmosphere. The most preferred gas mixture based upon the present experimental data includes about 5 vol. % ammonia, 11 vol. % hydrogen, and the remainder nitrogen.

It is difficult to obtain uniform coatings at temperatures below about 2200° F. even with long exposure. Therefore, the effective lower temperature limit is normally set at 2200° F. The experimental treatment process included placing the fiber in a nitriding atmosphere, heating the fiber over a 2 hour heating cycle to about 2400° F., and, thereafter, maintaining the temperature for 15–30 minutes to finish the nitriding reaction. Much faster heating cycles are foreseen and contemplated for commercial operations where the fibers may be drawn in a continuous process through the reaction zone. The experimental heating rate was selected in part by concern for furnace life. In practice, faster heating rates would be desired for optimal fiber strength retention.

A continuously flowing gas with flowrates between about 0 25 to 3.20 standard liters per minute was used in the experiments, but faster or slower flows will probably be just as useful. We do not believe that the flowrate is critical since the gas is in large excess to the boron in the fibers. Static furnace environments should also work.

The effectiveness of the operation may be dependent upon the level of oxygen within the nitriding atmosphere, although the effect of oxygen is not well understood. Reproduceable results, however, have been obtained in an inert gas furnace having a zirconia liner and molybdenum resistance heating elements. Such a furnace liner is produced by Zircar Products, Inc. of Florida, N.Y.

Coatings may be achievable with even lower concentrations of ammonia in the nitriding atmosphere, but reaction times would probably increase Ammonia or another suitable reactive source of nitrogen must be added to $N_2$ on to another inert gas to form the nitriding atmosphere because gaseous nitrogen alone will not react to form the boron nitride coating at the temperatures that must used. That is, at the temperatures usable in treating these fibers, $N_2$ alone will not react with the boron to any significant degree.

Although the description has focused upon aluminoborosilicate fibers, it is believed that the process is applicable to any boron-containing fiber, and particularly those containing boria NEXTEL 312 fibers are preferred.

When NEXTEL 312 fibers in a fiber cloth are coated with the method of the present invention, the resulting product is a crystalline aluminosilicate fiber having a thin boron nitride coating on all surfaces including fractures and fiber ends even in portions of the cloth where fibers overlap. This coated material is particularly well suited for use in radomes or other radar or electromagnetic ceramic applications.

While preferred embodiments of the invention have been described, those skilled in the art will readily recognize modifications which might be made to the invention without departing from its inventive concept. Therefore, the claims should be construed liberally in light of this description to adequately cover the invention, and should not be limited except as is necessary in light of pertinent prior art.

We claim:

1. A method for coating a ceramic fiber that contains boron with boron nitride, comprising the step of diffusing boron in the fiber to the fiber surface and reacting the diffusing boron at the surface with a suitable source of nitrogen in a nitriding atmosphere, to form a surface coating the reaction occurring at a temperature of between about 2200° F.–2600° F., wherein all the boron in the boron nitride coating comes from boron originally in the fiber.

2. The method of claim 1 wherein the atmosphere includes 5–100% vol. % ammonia.

3. The method of claim 1 wherein the atmosphere includes 5–10 vol. % ammonia, 0–12 vol. % hydrogen, and the remainder nitrogen.

4. The method of claim 1 wherein the temperature is between about 2400–2500° F.

5. The method of claim 1 wherein the atmosphere is a continuously flowing gas having a flowrate between about 0.25–3.2 standard liters/min.

6. The method of claim 1 wherein the ceramic fiber is oxide-based.

7. The method of claim 6 wherein the fiber includes boria.

8. The method of claim 7 wherein the fiber further includes aluminosilicate.

9. The method of claim 1 further comprising the step of crystallizing the remaining portion of the fiber during the reaction of boron with the atmosphere to form the coating.

10. A method for coating a ceramic fiber, comprising a major portion of aluminosilicate and a minor portion of boria, to produce a crystalline aluminosilicate fiber having a thin, uniform, and continuous boron nitride coating formed with boron initially within the fiber, the method comprising the steps of:

(a) heating an uncoated aluminoborosilicate fiber rapidly from about ambient to at least about 2200° F. in a nitriding atmosphere containing ammonia;

(b) diffusing boron from within the fiber to the surface of the fiber where the boron reacts with the atmosphere to form a boron nitride coating, the diffusing step occurring for between about 5–90 minutes at a temperature of about 2200–2600° F.

11. The method of claim 10 wherein the temperature during the diffusing step is about 2400–2500° F.

12. The method of claim 10 wherein the heating step lasts for no more than about two hours.

13. The method of claim 10 wherein the atmosphere includes about 5-10 vol. % ammonia, 0-12 vol. % hydrogen and the remainder nitrogen.

14. A method for coating an uncoated oxide-based ceramic fibers in a fiber cloth, the fiber comprising a major portion of aluminosilicate and a minor portion of boria, the product being a coated aluminosilicate fiber having a thin, continuous, uniform boron nitride coating on all surfaces of the fibers, including fractures and fiber ends, the boron in the coating coming wholly from boron within the fibers, the method comprising the steps of:
    (a) placing a fiber cloth in a furnace;
    (b) flowing a nitriding atmosphere past the fiber cloth in the furnace, the atmosphere containing at least 5 vol. % ammonia;
    (c) heating the furnace from ambient to at least about 2200° F. in no more than about two hours; and
    (d) maintaining the temperature between about 2200-2600° F. for between about 5-90 additional minutes to allow boron within the fibers to diffuse to the surface of the fibers and to react with the nitriding atmosphere at the fiber surface to form the boron nitride coating.

15. A boron nitride coated aluminosilicate ceramic fiber comprising an aluminosilicate fiber and a thin, uniform, continuous boron nitride coating at the surface of the fiber.

16. The fiber of claim 15 wherein the aluminosilicate is crystalline.

17. The fiber of claim 16 wherein the boron in the coating is initially within the fiber and is incorporated into the coating by diffusing the boron to the surface and reacting the boron there with a nitriding atmosphere to form boron nitride.

18. The fiber of claim 17 wherein the fiber includes about 12 wt % boria.

19. A boron nitride coated NEXTEL aluminoborosilicate fiber formed by coating a NEXTEL 312 fiber according to the method of claim 1.

20. The fiber cloth formed by the process of claim 14.

21. A ceramic fiber composite, comprising:
    a plurality of ceramic fibers, wherein each crystalline NEXTEL 312 fiber;
    a fiber coating of boron nitride disposed over each fiber made in accordance with the method of claim 1; and
    a glass ceramic matrix encapsulating said plurality of coated fibers.

* * * * *